(12) United States Patent
Bullard

(10) Patent No.: US 6,247,936 B1
(45) Date of Patent: Jun. 19, 2001

(54) ELECTRICAL DISTRIBUTION SYSTEM WITH FUSE SELECTABLE CIRCUITS

(75) Inventor: Peter Bullard, Schwenksville, PA (US)

(73) Assignee: Ron Francis, Aston, PA (US)

( * ) Notice: Subject to any disclaimer, the term of this patent is extended or adjusted under 35 U.S.C. 154(b) by 0 days.

(21) Appl. No.: 09/191,995

(22) Filed: Nov. 13, 1998

Related U.S. Application Data

(60) Provisional application No. 60/065,411, filed on Nov. 13, 1997.

(51) Int. Cl.[7] .............................. H01R 29/00; H02B 1/056
(52) U.S. Cl. .............................................. 439/49; 439/621
(58) Field of Search ............................ 439/49, 620, 621, 439/189, 510, 512; 361/622

(56) References Cited

U.S. PATENT DOCUMENTS 5,328,392 * 7/1994 Lin et al. ............................ 439/621
5,619,074 * 4/1997 Berch et al. ........................ 439/621
5,784,249 * 7/1998 Pouliot ................................ 361/622

* cited by examiner

Primary Examiner—Gary F. Paumen
Assistant Examiner—Alexander Gilman
(74) Attorney, Agent, or Firm—Robert S. Lipton; Lipton, Weinberger & Husick

(57) ABSTRACT

An electrical power distribution panel such as is typically used in automobiles provides for the connection of an accessory circuit to one of two power busses within the panel. One power buss may be energized at all times by direct connection to the battery, while the other power buss may be energized when an ignition switch is in either the "on" or "accessory" position. Selection of the buss which is connected to an accessory circuit is made by placement of the fuse for that accessory circuit so as to connect one or the other busses.

8 Claims, 5 Drawing Sheets

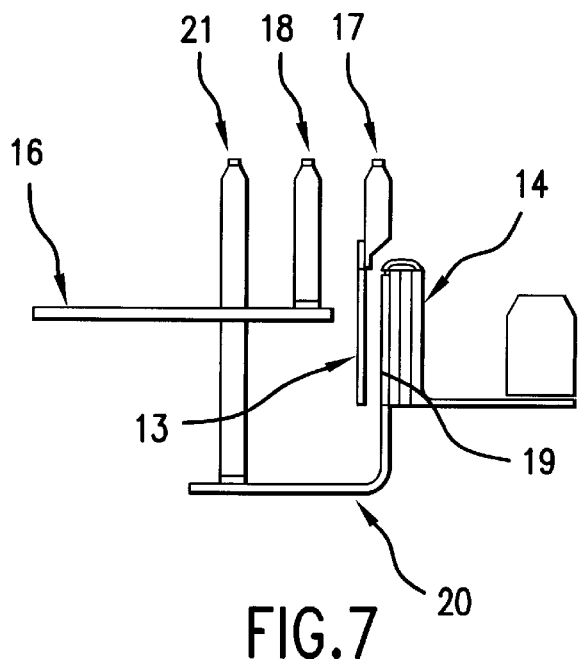
FIG.7
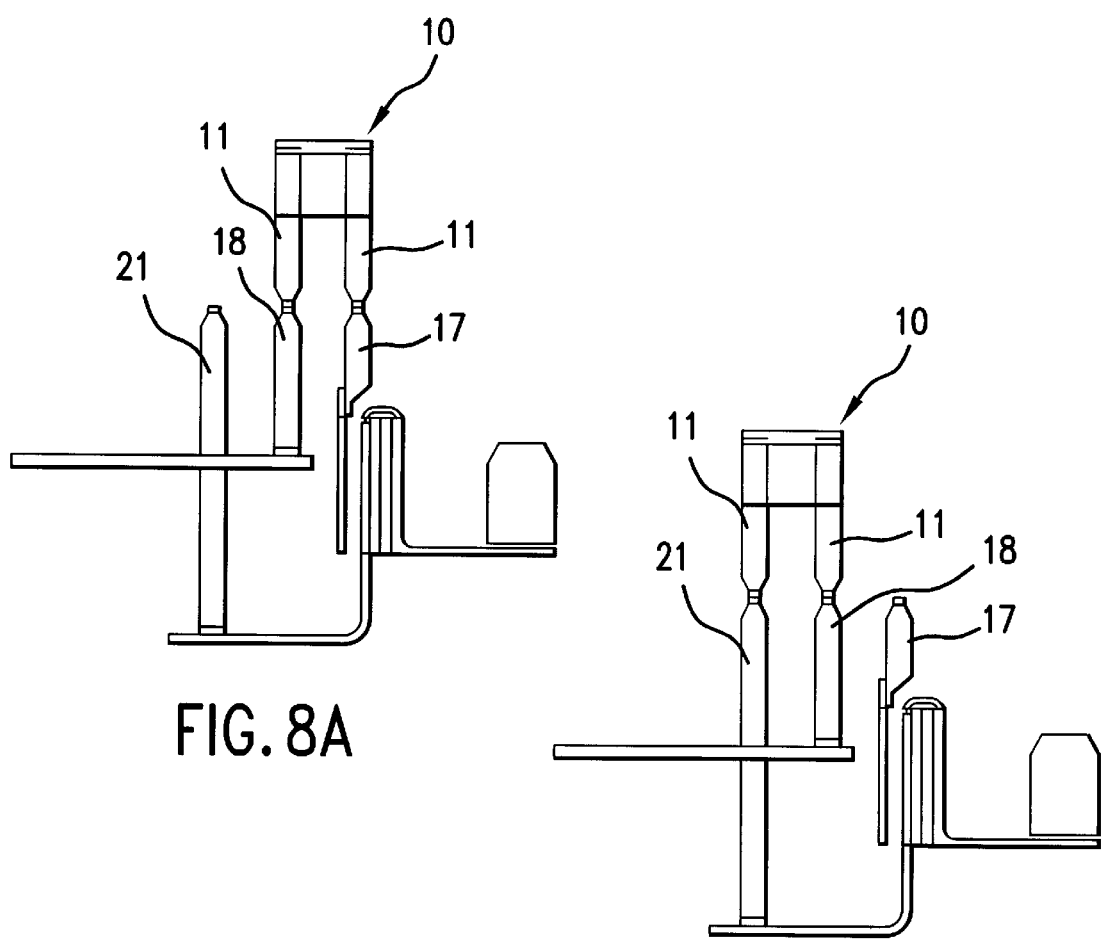
FIG.8A
FIG.8B

ELECTRICAL DISTRIBUTION SYSTEM WITH FUSE SELECTABLE CIRCUITS

This application is based upon U.S. Provisional Application No. 60/065,411 filed Nov. 13, 1997 entitled Electrical Circuit For Automobile Accessories.

BACKGROUND

In the automotive, off-road, or other mobile or stationary equipment industry, the electrical power distribution system is complex. Typically, manufacturers make an attempt to predict all of the requirements of the end user, but it is a very difficult task considering the wide variety of accessory devices which may need to be powered from the system. Individual preferences cannot always be accommodated in the fixed systems supplied by the manufacturers with the equipment. The invention of the present application described below provides a power distribution panel which permits the user to make certain changes in the power distribution system to make the system more responsive to his/her needs.

Typically, power distribution systems have a battery buss and a switched buss. The battery buss is powered all of the time, while the switched buss is typically powered only when the ignition switch is on. In automobiles, various accessories such as radios, CD players, cigarette lighter outlets, and extra cigarette lighter-type outlets, which may be used for a variety of purposes, including cellular phones, computers and the like, are connected to an "accessory" circuit. In some automobiles, the "accessory" circuit and, therefore, all accessories, receive no power when the ignition is in the "off" position. In other automobiles, the "accessory" circuit may be powered and all or some accessories may receive power when the automobile ignition switch is in the "off" position. A perceived disadvantage of having the electrical system for accessories being powered or "hot" while the ignition switch is in the "off" position is that, if one or more accessories are left on, especially overnight, the automobile battery may be discharged to a sufficient extent that the battery has insufficient power to start the automobile.

Automobiles generally also have an "accessory" position located on the ignition key switch which is accessible only when the key is in the switch. The "accessory" circuit is powered when the switch is turned to the "accessory" position. Requiring the use of the key prevents the accessories from being inadvertently left "on" when the driver is away from the automobile. Thus, some manufacturers enable accessories to be used only when the ignition is "on" or the ignition key switch is placed in the "accessory" position. Other automobile manufactures take the view that their customers may wish to use accessories when they are not in the automobile, e.g. they may wish to leave a computer or cellular phone "on" while connected to a cigarette lighter outlet at the same time leaving the ignition in the "off" and locked position.

The present invention provides a means for enabling the users of electrically powered equipment, especially automobiles, to determine whether some or all "accessory" circuits are powered when the ignition switch is in the "off" position or only when the ignition switch is in the "on" or "accessory" position.

Accordingly, it is the object of the present invention to provide a means using a fuse socket, to select whether or not the power to an automobile accessory circuit passes or bypasses the automobile's ignition switch.

SUMMARY OF THE INVENTION

The present invention includes one or more receptacles for two pronged fuses, such as are typically used in automobiles, which provide three appropriately spaced openings or slots which permit the two prongs of a fuse to be placed in either of two positions, the first position spanning the center and one of the outer slots, and the second position spanning the center and the other outer slot. The center slot is connected to an accessory device or an accessory circuit to which many devices are connected, and through the device(s), to ground. The placement of a fuse in one or the other of the two possible positions permits selection of two possible circuits for powering the accessory device or circuit.

Thus, one of the outer slots may be connected to a buss which is only powered when the automobile ignition key is in the "on" or "accessory" position. The other outer slot may be connected directly to the positive side of the battery and is thus always powered. If the fuse is placed so that the outer prong is inserted into the slot connected to the buss connected to the ignition switch, the accessory or accessory circuit will only have power when the ignition key is in the "on" or "accessory" position. If the fuse is placed so that the outer prong is inserted into the slot which is connected to the battery, the accessory or accessory circuit will be able to receive power when the ignition switch is in the "off" position. Thus, the user of an automobile may determine which mode of operation is used for each accessory or accessory circuit by appropriately positioning the fuse in the fuse receptacle of the present invention.

BRIEF DESCRIPTION OF THE DRAWINGS

FIG. 7 is a cross sectional view showing the arrangement of the three fuse prong terminals and the mechanical connection of the two busses to the terminals.

FIG. 8A shows a fuse connecting a first buss to the central accessory prong terminal.

FIG. 8B shows a fuse connecting a second buss to the central accessory prong terminal.

THE PREFERRED EMBODIMENT OF THE INVENTION

Figure 1:
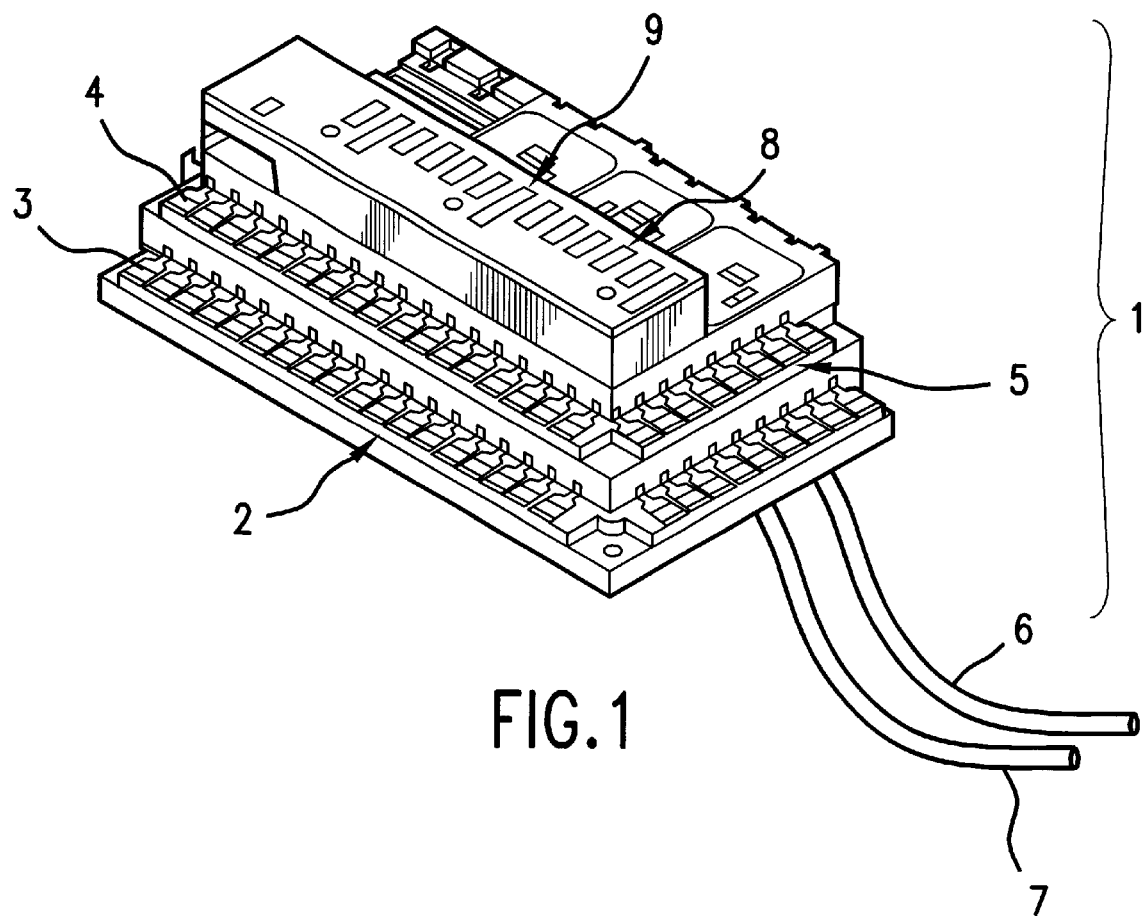
FIG. 1 shows a pictorial view of an automobile power distribution panel incorporating the present invention.

FIG. 1 shows a typical power distribution panel 1 such as may be utilized in an automobile. The distribution panel has output terminals 2 located on a lower level 3 and output terminals 4 located on an upper level 5. The output terminals are located on three sides of the power distribution panel for easy accessibility. A panel main power feed connector wire 6 and a main panel ground wire 7 are connected to the bottom of the panel. Fuses for the accessory systems which require protected (fused) power are mounted in the distribution panel through fuse =receptacles 8 in the panel top. Fuses which may be used to select one of two powered circuits according to the invention described in the present application, may be mounted through extended fuse receptacles 9 in the panel top.

Figure 2:
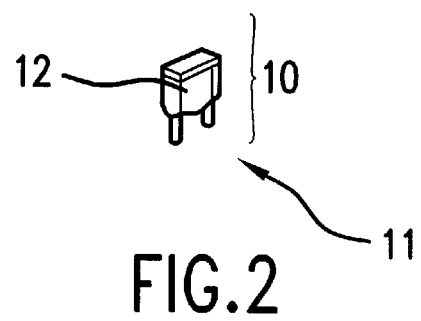
FIG. 2 shows an automobile fuse having two prongs or connection terminals.

A typical fuse 10, shown in FIG. 2, has two connection terminals or prongs 11 extending from its bottom with which electrical contact is made. The fusible element is housed within the body 12 of the fuse and completes the electrical circuit between the two prongs 11. Current passes through the fuse, completing the circuit between the power source and the accessory circuit thereby protecting the accessory circuit against a too high harmful current draw.

Figure 3:
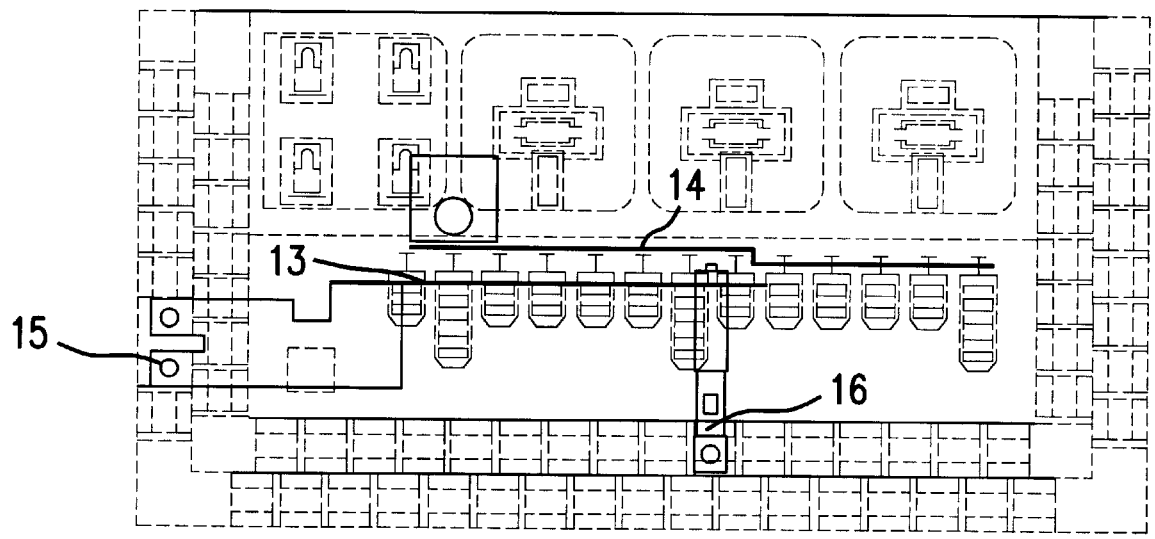
FIG. 3 shows a top view of an automobile power distribution panel embodying the present invention.

As shown in FIG. 3, internal to the power distribution panel are two current carrying conductors (busses) 13 and 14 which carry power from the panel main power feed. Any number of output terminals 2 and 4 may be connected to each buss 13 and 14 via a fuse 10 depending on the design of the panel. FIG. 3 shows, by way of example and not limitation thereof, output terminals 15 connected via a fuse 10 to buss 13 and output terminals 16 connected via a fuse 10 to buss 14. As shown in this example, buss 13 is powered when the ignition switch is "on" or in its "accessory" position. Buss 14 bypasses the ignition switch and is directly powered by the automobile battery at all times. Output terminals, such as 16, are connected to buss 14 by the correct placement of the corresponding fuse according to this invention.

Figure 4:
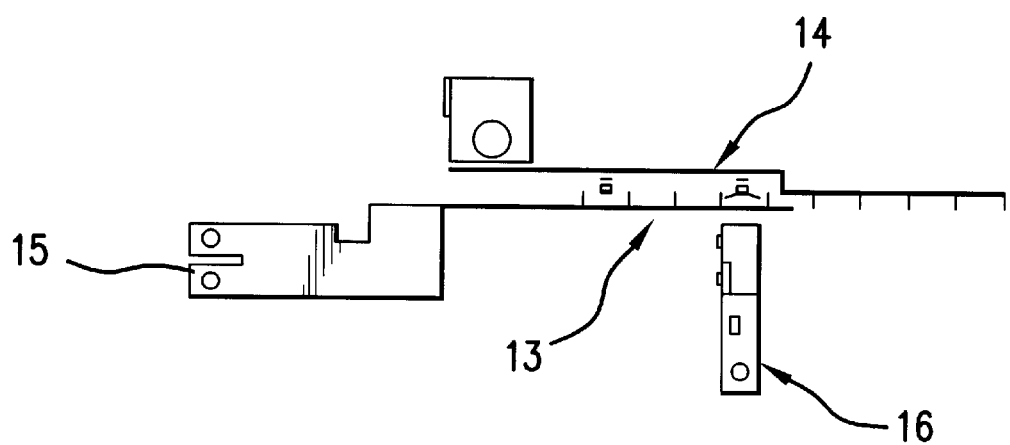
FIG. 4 shows the mechanical arrangement of two power busses within the power distribution panel.
Figure 5:
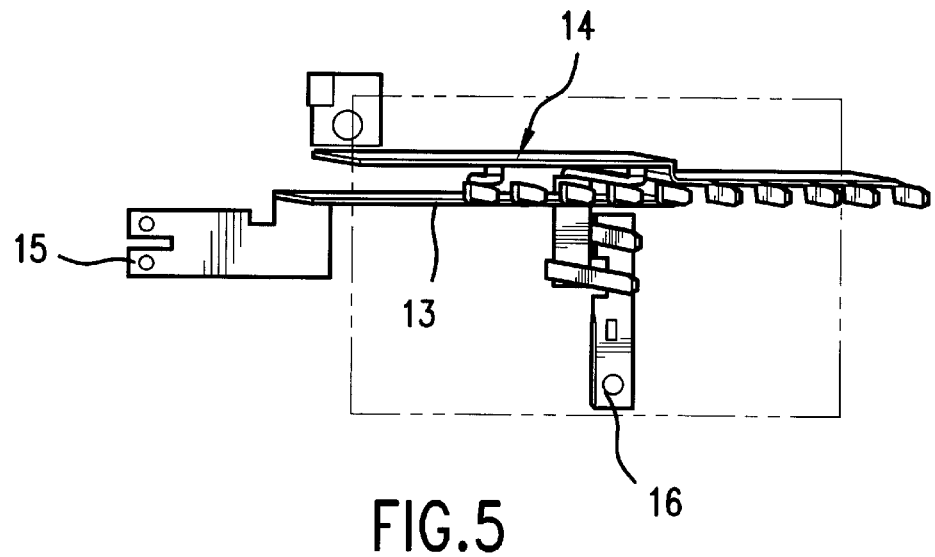
FIG. 5 shows the invention depicted in FIG. 4 from a different perspective.
Figure 6:
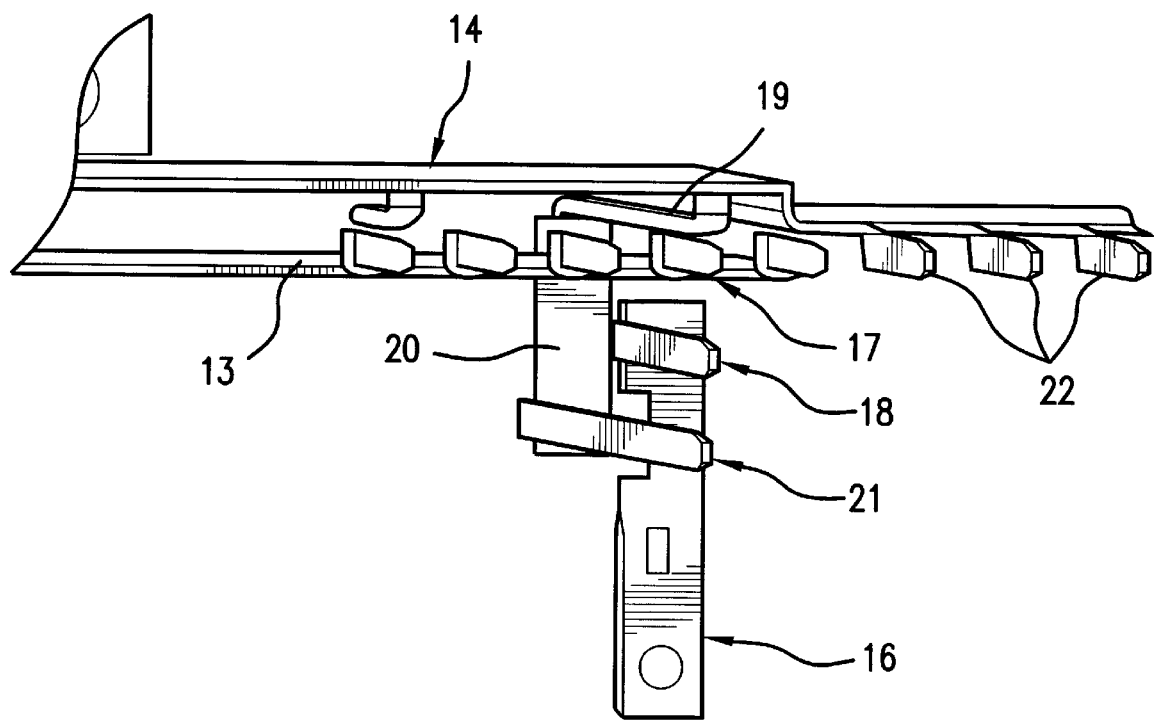
FIG. 6 shows an enlarged view of the area within the delimited boundry indicated in FIG. 5 of the invention shown in FIGS. 4 and 5 from an additional perspective.

FIG. 4 shows the exemplary current carrying conductors in plan view, while FIG. 5 shows the same parts in a rotated view to show the spatial relationship between the parts. FIG. 6 is a blown up view showing the mechanical configuration corresponding to the two electrical circuits implemented by the invention. Terminal tabs 17, 18, and 21 are positioned so that fuse prongs 11 may make mechanical and electrical contact with them when fuse 10 is placed in correct alignment above them. Typically, receptacle slots will be provided to locate the fuse prongs above the terminals. Alternatively, the terminal tabs may be mechanically and electrically connected to the prong receptacle slots. Terminal tab 17 is directly attached to buss 13. Terminal tab 21 is connected to extension 20 which is in turn connected to buss 14 by connector 19. As noted above, terminal tab 17 will be powered by buss 13 only when the ignition switch is "on" or in the "accessory" position". Terminal tab 21 will be powered from buss 14 at all times since buss 14 is directly connected to the battery.

Terminal tab 18 is connected to output terminal 16. No power may be supplied to output terminal 16 until a fuse is used to connect one of the powered terminal tabs 17 or 21 to terminal tab 18. Additional terminal tabs 22 are connected to buss 14 and may be used to provide power to additional circuits at all times when the selection capability of the present invention is not necessary. Examples of such circuits may be the headlight circuit, the brake light circuit, and others which should not be switched by the ignition switch.

FIG. 7 shows a side view of the mechanical configuration corresponding to the two electrical circuits implemented by the invention pointing out the three individual terminal tabs 17, 18, and 21 which are collinear when viewed from the top.

A fuse may be positioned in the device embodying the present invention in one of two positions. In a first position, the fuse completes the circuit to the accessory circuit from the buss which is switched through the ignition switch. In a second position, the fuse completes the circuit to the accessory circuit from the buss which is powered at all times. FIG. 8A shows a fuse 10 in the first position wherein one fuse prong 11 is in mechanical and electrical contact with terminal tab 17 and the other fuse prong 11 is in contact with terminal tab 18. The circuit between buss 13 and output terminal 16 is completed through fuse 10. As noted above, terminal tab 17 is electrically connected to buss 13 which is supplied with power only when the ignition switch is in the "on" or "accessory" position. In this case, the selected fuse position determines that the accessory circuit will only be powered when the ignition switch is in the "on" or "accessory" position.

FIG. 8B shows a fuse 10 in the second position wherein one fuse prong 11 is in mechanical and electrical contact with terminal tab 18 and the other fuse prong 11 is in contact with terminal tab 21. The circuit between buss 14 and output terminal 16 is completed through fuse 10. As noted above, terminal tab 21 is electrically connected to buss 14 which is supplied with power at all times directly from the battery. Consequently, in this second case, the selected fuse position determines that the accessory circuit will be powered at all times.

Figure 9:
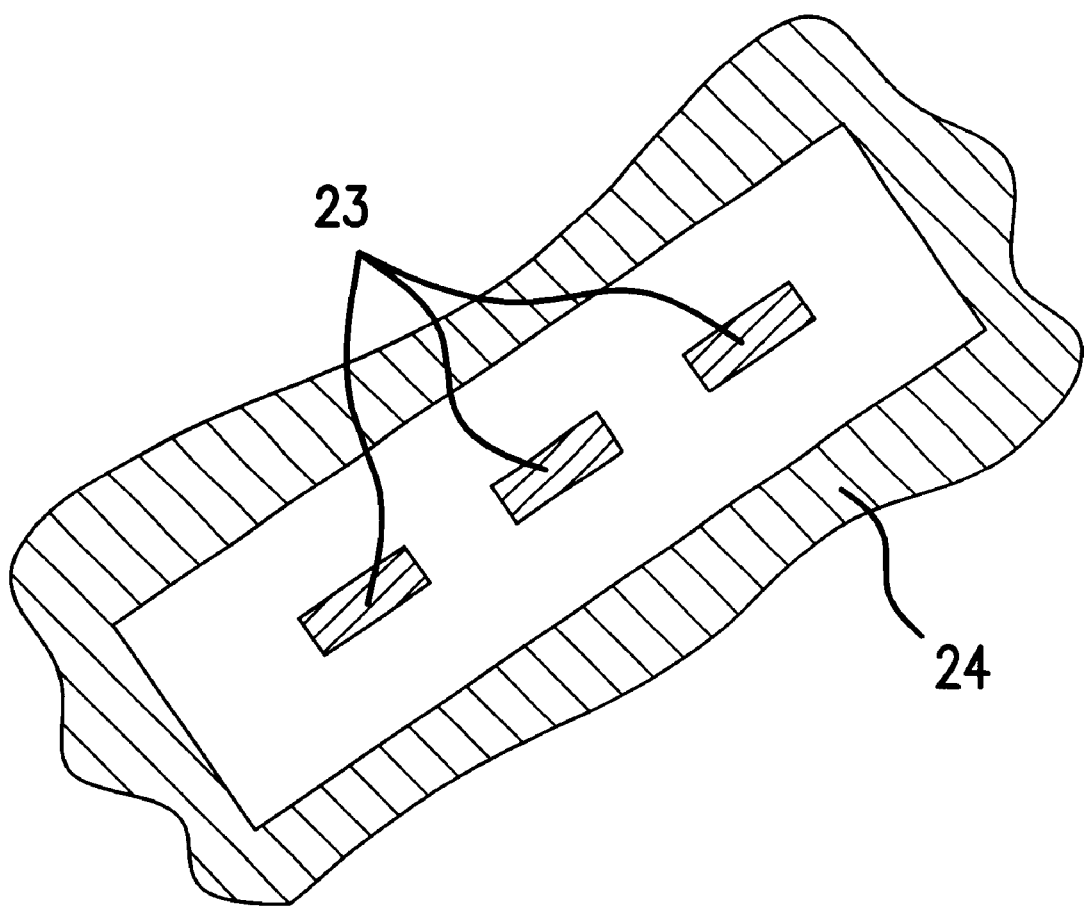
FIG. 9 shows a view looking straight down on an extended slot of the power distribution panel shown in FIG. 1.

FIG. 9 shows a view looking straight down on an extended fuse receptacle 9 of the power distribution panel 1. Three coplanar female receptacle slots 23 adapted to receive the prongs 11 of fuses 10 are arranged so that fuse 10 may be placed in the two different positions described above. The female receptacle slots 23 are located a short distance below the top surface 24 of the power distribution panel so that the fuses are protected in a recess when installed in the panel and yet extend sufficiently above the top surface 24 so that the fuses may be grasped for removal. Terminals 17, 18, and 21 are located below receptacle slots 23 so that when the fuse prongs 11 are inserted in receptacle slots 23 electrical and mechanical contact is made with terminals 17, 18, and 21. Alternatively, receptacle slots 23 may be formed from or are in mechanical and electrical connection with terminals 17, 18, and 21 so as to form electrical contacts.

Any number of fuse selectable circuits as described in this invention may be employed in any given power distribution panel depending on the needs and flexibility required for that panel. In FIG. 1, three such fuse selectable circuits are shown by way of example and not limitation. Individual accessories may be individually fused through one of the selectable circuits or several accessories may be attached to the same fuse selectable circuit depending on the particular needs of the automobile owner. Of course, the amperage of the fuse needs to be adjusted accordingly as is well understood by those skilled in the art.

Thus, by appropriately positioning the fuse to provide power from one buss or the other, an automobile accessory circuit may be powered only when the ignition key is placed in an appropriate position or may be continuously powered even when the ignition is in the "off" and locked position. Although the invention has been shown with respect to a particular embodiment, it is to be understood that various variations may be made which come within the scope of the invention.

I claim:

1. A power distribution panel for selectively choosing between at least two remote power sources by selectively positioning a fuse, the power distribution panel comprising:

at least two power busses, including a first power buss having means for electrically connecting said first power buss to a remote first power source, a second power buss, and means for electrically connecting said second power buss to a remote second power source;

at least one fuse receptacle having three electrically-isolated contacts, each of which is adapted to receive one of two electrical prongs of a fuse, physically arranged so that one contact is a common contact by which the fuse is connected to the common contact with one prong and permitting the selective electrical contact of the remaining prong of the fuse with either of the two remaining contacts;

a means for connecting an accessory circuit to the common contact;

an electrical connection between the first power buss and one of the three electrically-isolated contacts which is not the common contact; and an electrical connection between the second power buss and the electrically-isolated contact which is not the common contact or the contact connected to the first buss wherein the placement of the fuse in two out of the three contacts in the fuse receptacle connects the accessory circuit to one of the power busses through the fuse.

2. The power distribution panel of claim 1 for use in a motor vehicle further comprising an electrical connection for connecting said first power buss to an ignition switch of the vehicle so that power is provided to said first power buss when said ignition switch is turned to its on position; and a second electrical connection for connecting said second power buss directly to a battery of the vehicle so that power is provided at all times to said second power buss regardless of the position of the ignition switch.

3. The power distribution panel of claim 2 in which the fuse is a two prong automobile fuse.

4. The power distribution panel of claim 3 in which the fuse receptacle contacts are arranged in a straight line.

5. The power distribution panel of claim 1 in which the fuse is a two prong automobile fuse.

6. The power distribution panel of claim 5 in which the fuse receptacle contacts are arranged in a straight line.

7. The power distribution panel of claim 6 further comprising a fuse receptacle having a first outer contact, a center contact and a second outer contact in which the center contact is the common contact and the outer contacts are electrically connected to their respective power busses.

8. An electrical circuit in a motor vehicle, said electrical circuit comprising:

a. first electrical conduction means connected to an ignition switch in said motor vehicle said first electrical conduction means is powered up when the ignition switch is turned on;

b. second electrical conduction means connected to a battery in said motor vehicle, such that said second electrical conduction means is powered-up continuously;

c. a fuse having two prongs;

d. a fuse receptacle having first, second and third contacts, said second contact being positioned between said first and third contacts, said contacts positioned to permit said fuse prongs to electrically connect the second contact with either of the other two contacts, and a first electrical connector for connecting said first contact to said first electrical conduction means, a second electrical connector for connecting said third contact to said second electrical conduction means, and third electrical connection for connecting said second contact to an accessory in said motor vehicle.

* * * * *